(12) United States Patent
Sun

(10) Patent No.: US 12,449,663 B2
(45) Date of Patent: Oct. 21, 2025

(54) AUGMENTED REALITY DISPLAY DEVICE

(71) Applicants: Interface Optoelectronics (ShenZhen) Co., Ltd., Guangdong (CN); Interface Technology (ChengDu) Co., Ltd., Sichuan (CN); General Interface Solution Limited, Miaoli County (TW)

(72) Inventor: Bo-Jhang Sun, Guangdong (CN)

(73) Assignees: Interface Optoelectronics (ShenZhen) Co., Ltd., Guangdong (CN); Interface Technology (ChengDu) Co., Ltd., Sichuan (CN); General Interface Solution Limited, Miaoli County (TW)

( * ) Notice: Subject to any disclaimer, the term of this patent is extended or adjusted under 35 U.S.C. 154(b) by 155 days.

(21) Appl. No.: 18/430,619

(22) Filed: Feb. 1, 2024

(65) Prior Publication Data

US 2025/0138314 A1 May 1, 2025

(30) Foreign Application Priority Data

Oct. 26, 2023 (CN) .......................... 202311404120.3

(51) Int. Cl.
*G02B 5/00* (2006.01)
*F21V 8/00* (2006.01)
(Continued)

(52) U.S. Cl.
CPC ......... *G02B 27/0172* (2013.01); *G02B 6/003* (2013.01); *G02B 27/024* (2013.01); *G02F 1/15* (2013.01); *G02B 2027/0178* (2013.01)

(58) Field of Classification Search
CPC .............................. G02B 27/0172; G02F 1/15
See application file for complete search history.

(56) References Cited

U.S. PATENT DOCUMENTS

| 6,011,642 A * | 1/2000 | Vink ...................... G02F 1/1524 359/273 |
| 8,476,929 B2 * | 7/2013 | Kimura .................. G11C 19/28 326/46 |

(Continued)

FOREIGN PATENT DOCUMENTS

| CN | 206946103 U | 1/2018 |
| CN | 213182200 U | 5/2021 |

(Continued)

OTHER PUBLICATIONS

Spitzer, Eyeglass-Based Systems for Wearable Computing, 1997, IEEE, pp. 48-51.*

*Primary Examiner* — Cheng Yuan Tseng
(74) *Attorney, Agent, or Firm* — CKC & Partners Co., LLC

(57) ABSTRACT

An augmented reality display device includes a light source, a waveguide module and a solar charging layer. The light source has a light-emitting area. The waveguide module is located on the light-emitting area of the light source and includes a first glass layer, a waveguide element, an electrochrome layer and a second glass layer. The first glass layer is located on the light-emitting area of the light source. The electrochrome layer is located on a surface of the waveguide element facing away the first glass layer. The second glass layer is located a surface of the electrochrome layer facing away the waveguide element. The solar charging layer is located on a surface of the second glass layer facing away the electrochrome layer, in which the solar charging layer electrically connects the light source and is configured to charge the light source.

20 Claims, 4 Drawing Sheets

(51) Int. Cl.
  *G02B 27/01* (2006.01)
  *G02B 27/02* (2006.01)
  *G02F 1/15* (2019.01)

(56) References Cited

U.S. PATENT DOCUMENTS

| | | | | |
|---|---|---|---|---|
| 9,069,187 | B2* | 6/2015 | Chen | G02C 7/10 |
| 9,097,891 | B2* | 8/2015 | Border | G02B 27/0093 |
| 10,359,647 | B2* | 7/2019 | Vasiliev | G02C 7/101 |
| 10,366,803 | B2* | 7/2019 | Hitosugi | C23C 14/083 |
| 10,598,961 | B2* | 3/2020 | Shibuya | G02B 5/3016 |
| 10,604,270 | B2* | 3/2020 | Descheemaeker | H04N 5/58 |
| 11,567,382 | B2* | 1/2023 | Tang | G02F 1/155 |
| 12,058,901 | B2* | 8/2024 | Shen | G02F 1/157 |
| 12,230,456 | B2* | 2/2025 | Fleischer | H01G 9/2009 |
| 2010/0294330 | A1* | 11/2010 | Huang | G02F 1/157 |
| | | | | 438/73 |
| 2012/0243068 | A1* | 9/2012 | Yeh | E06B 9/264 |
| | | | | 359/275 |
| 2012/0258294 | A1* | 10/2012 | Leyder | H10K 59/8731 |
| | | | | 204/192.1 |
| 2016/0005375 | A1* | 1/2016 | Naijo | G09G 3/38 |
| | | | | 359/267 |
| 2018/0324177 | A1 | 11/2018 | Wang | |
| 2018/0348524 | A1* | 12/2018 | Blum | G02B 27/0176 |
| 2020/0082630 | A1* | 3/2020 | Sharma | G06Q 10/08 |
| 2021/0409675 | A1 | 12/2021 | Min et al. | |
| 2023/0238595 | A1* | 7/2023 | Lee | G02F 1/1533 |
| | | | | 136/252 |
| 2024/0274727 | A1* | 8/2024 | Luo | G02C 11/10 |
| 2025/0123522 | A1* | 4/2025 | Russell | G02F 1/134336 |
| 2025/0138314 | A1* | 5/2025 | Sun | G02B 27/024 |

FOREIGN PATENT DOCUMENTS

| | | | |
|---|---|---|---|
| CN | 217639756 U | 10/2022 | |
| CN | 116047824 A | 5/2023 | |
| TW | M409446 U | 8/2011 | |
| WO | WO-2024181607 A1 * | 9/2024 | G02C 7/10 |

* cited by examiner

AUGMENTED REALITY DISPLAY DEVICE

RELATED APPLICATIONS

This application claims priority to China Application Serial Number 202311404120.3, filed Oct. 26, 2023, which is herein incorporated by reference.

BACKGROUND

Field of Disclosure

The present disclosure relates to an augmented reality display device.

Description of Related Art

As the progress of technology, the application of augmented reality (AR) glasses has been more extensive. The AR glasses on the market mainly consist of a light source and a waveguide module, which display an image through the projection of the image from the light source. However, since the AR glasses are wearable devices, the size of the battery cannot be extended, which limits the using time of the AR glasses after fully charged.

SUMMARY

One aspect of the present disclosure provides an augmented reality display device.

According to some embodiments of the present disclosure, an augmented reality display device includes a light source, a waveguide module and a solar charging layer. The light source has a light-emitting area. The waveguide module is located on the light-emitting area of the light source and includes a first glass layer, a waveguide element, an electrochrome layer and a second glass layer. The first glass layer is located on the light-emitting area of the light source. The waveguide element is located on a surface of the first glass layer facing away the light source. The electrochrome layer is located on a surface of the waveguide element facing away the first glass layer. The second glass layer is located a surface of the electrochrome layer facing away the waveguide element. The solar charging layer is located on a surface of the second glass layer facing away the electrochrome layer, in which the solar charging layer electrically connects the light source and is configured to charge the light source.

In some embodiments of the present disclosure, the first glass layer has a first protruding portion, and the first protruding portion is engaged to the light-emitting area of the light source.

In some embodiments of the present disclosure, the waveguide element includes a light in-coupling area and a light-out-coupling area.

In some embodiments of the present disclosure, the waveguide element has a second protruding portion, and the light in-coupling area of the waveguide element is located in the second protruding portion.

In some embodiments of the present disclosure, the second protruding portion of the waveguide element overlaps with the light source.

In some embodiments of the present disclosure, the electrochrome layer has a third protruding portion, and the third protruding portion of the electrochrome layer overlaps with the light source.

In some embodiments of the present disclosure, the second glass layer has a fourth protruding portion, and the fourth protruding portion of the second glass layer overlaps with the light source.

In some embodiments of the present disclosure, the solar charging layer has a fifth protruding portion, and the fifth protruding portion of the solar charging layer overlaps with the light source.

Another aspect of the present disclosure provides an augmented reality display device.

According to some embodiments of the present disclosure, an augmented reality display device includes a light source, a waveguide module and a solar charging layer. The light source has a light-emitting area. The waveguide module is located on the light-emitting area of the light source and includes a first glass layer, a waveguide element, a second glass layer and an electrochrome layer. The first glass layer is located on the light-emitting area of the light source. The waveguide element is located on a surface of the first glass layer facing away the light source. The second glass layer is located on a surface of the waveguide element facing away the first glass layer. The electrochrome layer is located on a surface of the second glass layer facing away the waveguide element. The solar charging layer is detachably located on a surface of the electrochrome layer facing away the second glass layer, in which the solar charging layer electrically connects the light source and is configured to charge the light source.

In some embodiments of the present disclosure, the first glass layer has a first protruding portion, and the first protruding portion is engaged to the light-emitting area of the light source.

In some embodiments of the present disclosure, the waveguide element includes a light in-coupling area and a light-out-coupling area.

In some embodiments of the present disclosure, the waveguide element has a second protruding portion, and the light in-coupling area of the waveguide element is located in the second protruding portion.

In some embodiments of the present disclosure, the second protruding portion of the waveguide element overlaps with the light source.

In some embodiments of the present disclosure, the second glass layer has a fourth protruding portion, and the fourth protruding portion of the second glass layer overlaps with the light source.

In some embodiments of the present disclosure, the solar charging layer has a fifth protruding portion, and the fifth protruding portion of the solar charging layer overlaps with the light source.

Another aspect of the present disclosure provides an augmented reality display device.

According to some embodiments of the present disclosure, an augmented reality display device includes a light source, a waveguide module and a solar charging layer. The light source has a light-emitting area. The waveguide module is located on the light-emitting area of the light source and includes a first glass layer, a waveguide element, an electrochrome layer and a second glass layer. The first glass layer has a first protruding portion. The waveguide element is located on a surface of the first glass layer facing away the light source. The electrochrome layer is located on a surface of the waveguide element facing away the first glass layer. The second glass layer is located a surface of the electrochrome layer facing away the waveguide element. The solar charging layer is located on a surface of the second glass layer facing away the electrochrome layer, in which the solar charging layer electrically connects the light source and is configured to charge the light source.

In some embodiments of the present disclosure, the waveguide element includes a light in-coupling area and a light-out-coupling area.

In some embodiments of the present disclosure, the waveguide element has a second protruding portion, and the light in-coupling area of the waveguide element is located in the second protruding portion.

In some embodiments of the present disclosure, the second protruding portion of the waveguide element overlaps with the light source.

In some embodiments of the present disclosure, the electrochrome layer has a third protruding portion, and the third protruding portion of the electrochrome layer overlaps with the light source.

In the aforementioned embodiments of the present disclosure, since the solar charging layer is disposed at the outmost of the augmented reality display device, the solar charging layer can charge the battery in the light source through external light such as sunlight, and thus achieve the effect of extending the using time of the battery of the light source and reducing the weight of the charging device, which improves the competitiveness of the product.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
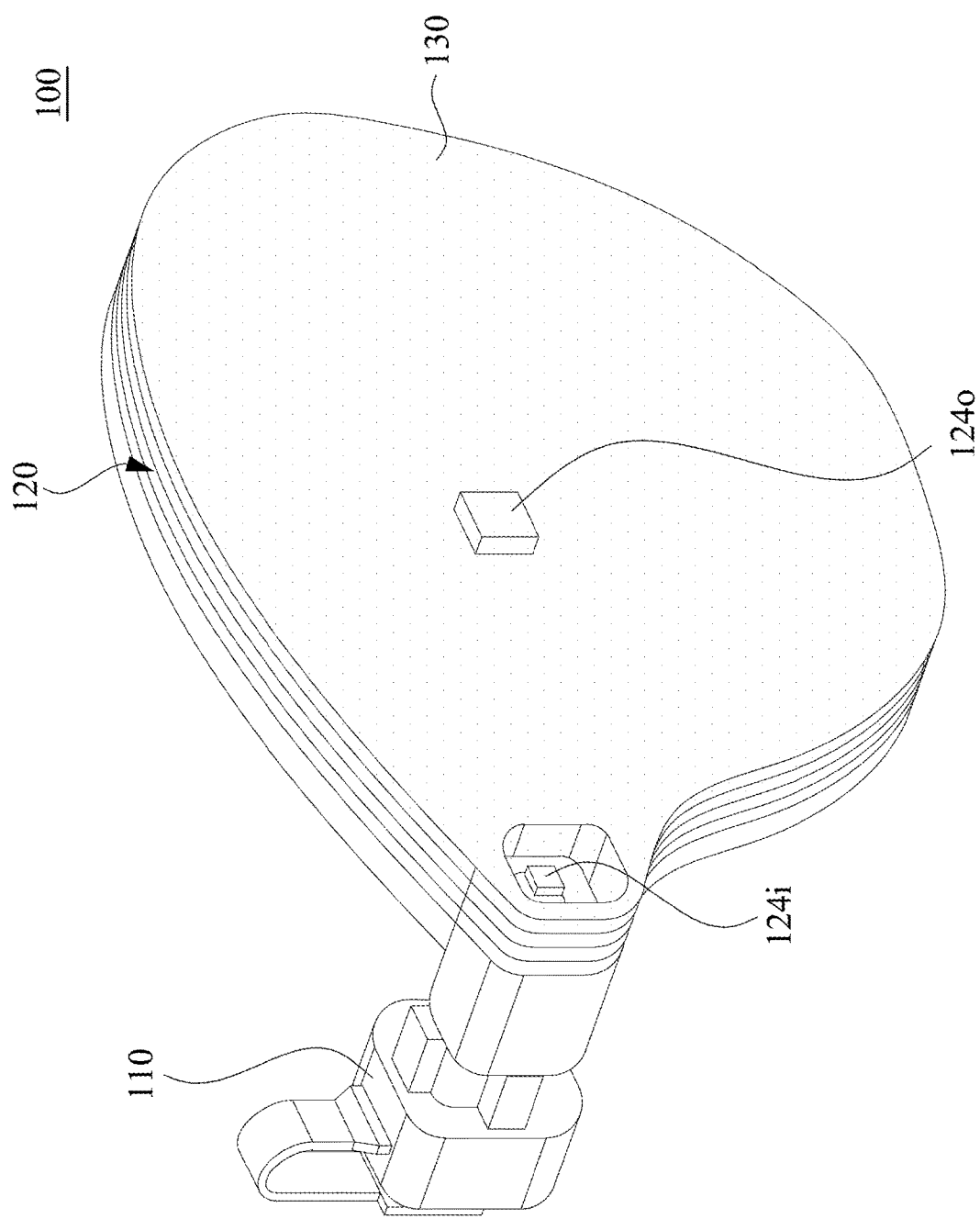
FIG. 1 is a stereogram of an augmented reality display device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
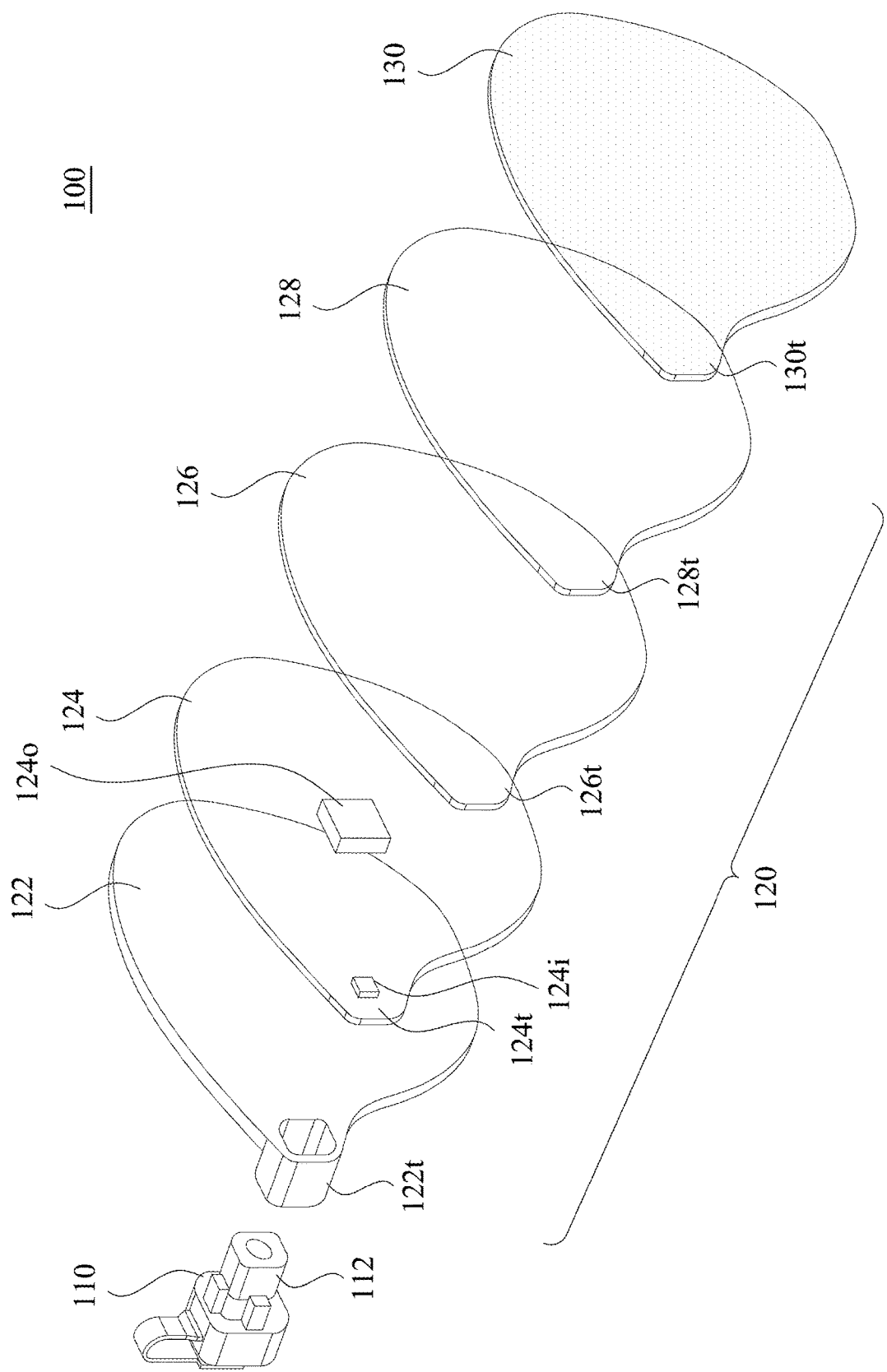
FIG. 2 is an exploded view of the augmented reality display device of FIG. 1.

FIG. 1 is a stereogram of an augmented reality display device 100 according to one embodiment of the present disclosure. FIG. 2 is an exploded view of the augmented reality display device 100 of FIG. 1. Refer to FIG. 1 and FIG. 2, an augmented reality display device 100 includes a light source 110, a waveguide module 120 and a solar charging layer 130. The light source 110 has a light-emitting area 112. The waveguide module 120 is located on the light-emitting area 112 of the light source 110 and includes a first glass layer 122, a waveguide element 124, an electrochrome (EC) layer 126 and a second glass layer 128. The first glass layer 122 is located on the light-emitting area 112 of the light source 110 and extends from the light-emitting area 112. The waveguide element 124 is located on a surface of the first glass layer 122 facing away the light source 110. The electrochrome layer 126 is located on a surface of the waveguide element 124 facing away the first glass layer 122. The second glass layer 128 is located a surface of the electrochrome layer 126 facing away the waveguide element 124. The solar charging layer 130 is located on a surface of the second glass layer 128 facing away the electrochrome layer 126 and the solar charging layer 130 is configured to charge the light source 110. In other words, the solar charging layer 130 electrically connects the battery in the light source 110 and charge the battery in the light source 110 through external light. In some embodiments, the material of the solar charging layer 130 is Perovskite Solar Cell (PSC). Perovskite solar cell is a thin flexible solar cell, which can be nearly transparent (a little bit yellow is also feasible) when the thickness is thin. Therefore, in the augmented reality display device 100, the solar charging layer 130 can not only be a solar cell for charging but also be a lens as sunglasses.

In particular, in the present embodiment, when the solar charging layer 130 at the outmost is irradiated, the active layer made of perovskite in the solar charging layer 130 will generate electron-hole pairs, and thus generate a voltage in the circuit since the electrons and the holes drift to the cathode and anode respectively, which can be equivalent to a battery, and can have the effect of electricity generation. At this time, sine the solar charging layer 130 electrically connects to the battery in the light source 110, the solar charging layer 130 can be used to charge the battery. Furthermore, since the solar charging layer 130 has high transparency, the augmented reality display device 100 with additional solar charging layer 130 can be used without additional effect, and can significantly improve the using time of the augmented reality display device 100 without external power source.

Since the solar charging layer 130 is disposed at the outmost of the augmented reality display device 100, the solar charging layer 130 can charge the battery in the light source 110 through external light such as sunlight, and thus achieve the effect of extending the using time of the battery of the light source 110 and reducing the weight of the charging device, which improves the competitiveness of the product.

In some embodiments, the first glass layer 122 has a first protruding portion 122t, and the first protruding portion 122t is engaged to the light-emitting area 112 of the light source 110. For example, the first protruding portion 122t of the first glass layer has an opening, and the opening is sleeved to the light-emitting area 112 of the light source 110 such that the first protruding portion 122t surrounds the light-emitting area 112 of the light source 110. Thus, the light emitted by the light-emitting area 112 of the light source 110 can directly reach the light in-coupling area 124i of the waveguide element. In some embodiments, the waveguide element 124 includes a light in-coupling area 124i and a light-out-coupling area 1240. The light in-coupling area 124i is configured to receive a light beam from the light-emitting area 112 of the light source 110, and make the light beam produce total internal reflection in the waveguide element 124 until the light beam reaches the light out-coupling area 1240 and is projected to the eyes of the user. The waveguide element 124 has a second protruding portion, and the light in-coupling area 124i of the waveguide element 124 is located in the second protruding portion 124t. The second protruding portion 124t of the waveguide element 124 overlaps with the light source 110. The term "overlap" means covers herein. In other words, the first protruding portion 122t of the first glass layer 122 at least partially or completely overlaps with the second protruding portion 124t of the waveguide element 124. The electrochrome layer 126 has a third protruding portion 126t, and the third protruding portion 126t of the electrochrome layer 126 overlaps with the light source 110. In other words, the third protruding portion 126t of the electrochrome layer 126 at least partially or completely overlaps with the second protruding portion 124t of the waveguide element 124. The second glass layer 128 has a fourth protruding portion 128t, and the fourth protruding portion 128t of the second glass layer 128 overlaps with the light source 110. In other words, the fourth protruding portion 128t of the second glass layer 128 at least partially or completely overlaps with the third protruding portion 126t of the electrochrome layer 126. The solar charging layer 130 has a fifth protruding portion 130t, and the fifth protruding portion 130t of the solar charging layer 130 overlaps with the light source 110. In other words, the fifth protruding portion 130t of the solar charging layer 130 at least partially or completely overlaps with the fourth protruding portion 128t of the second glass layer 128.

In the present embodiment, the electrochrome layer 126 is located between the waveguide element 124 and the second glass layer 128. The electrochrome layer 126 is configured to make use of the voltage provided by the power source to adjust the color of the electrochrome layer 126 to achieve the effect of accommodating the user to different environments such as indoor and outdoor. The waveguide element 124 is located between the electrochrome layer 126 and the first glass layer 122. The second glass layer 128 is located between the solar charging layer 130 and the electrochrome layer 126. In the present embodiment, the solar charging layer can be fixed or detachable. In some embodiments, the augmented reality display device 100 can be a pair of augmented reality glasses with two augmented reality display device 100 as a group. But in other embodiments, the waveguide module and the solar charging layer of the augmented reality display device can also be design into a shape of a single ophthalmic lens.

Figure 3:
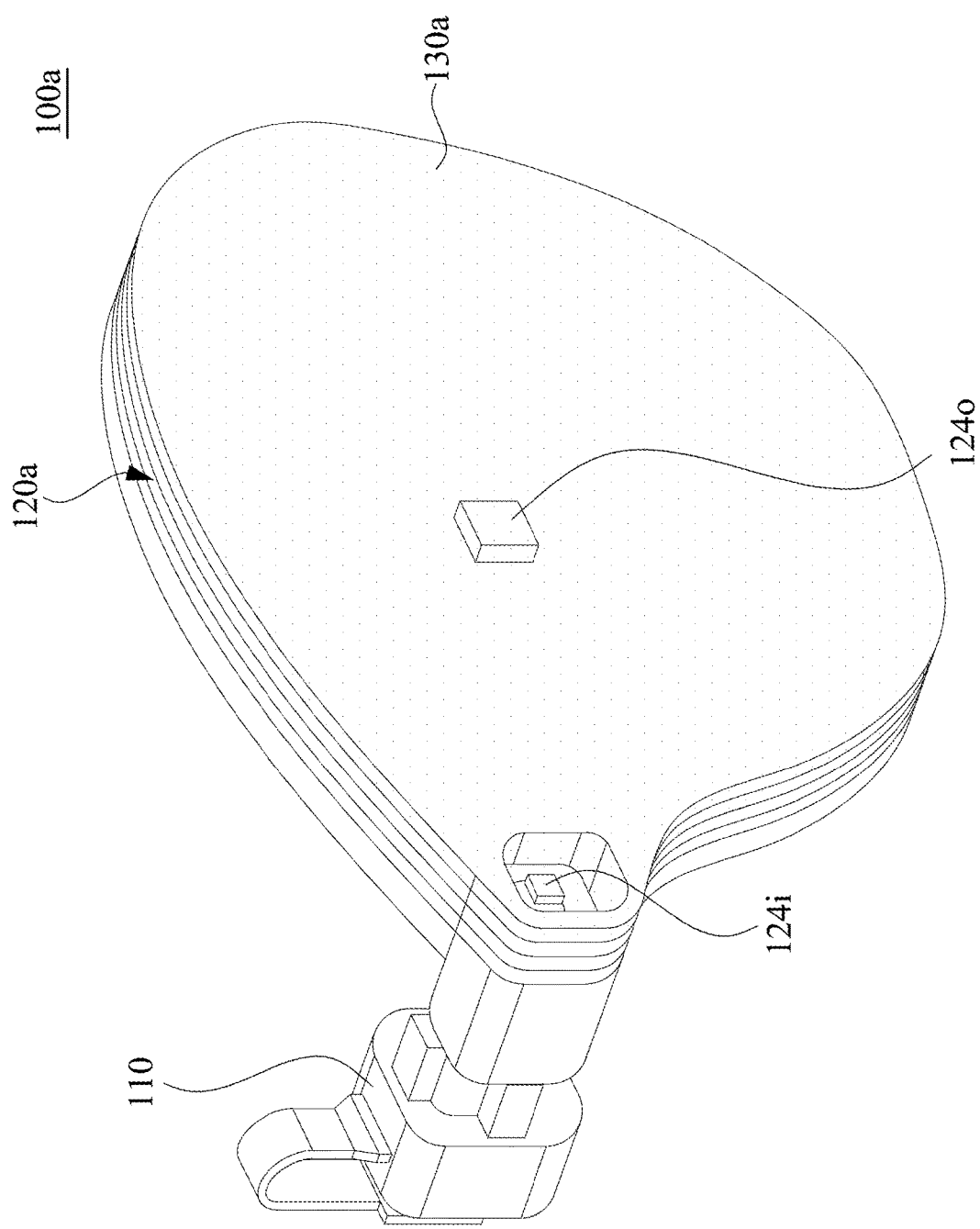
FIG. 3 is a stereogram of an augmented reality display device according to another embodiment of the present disclosure.
Figure 4:
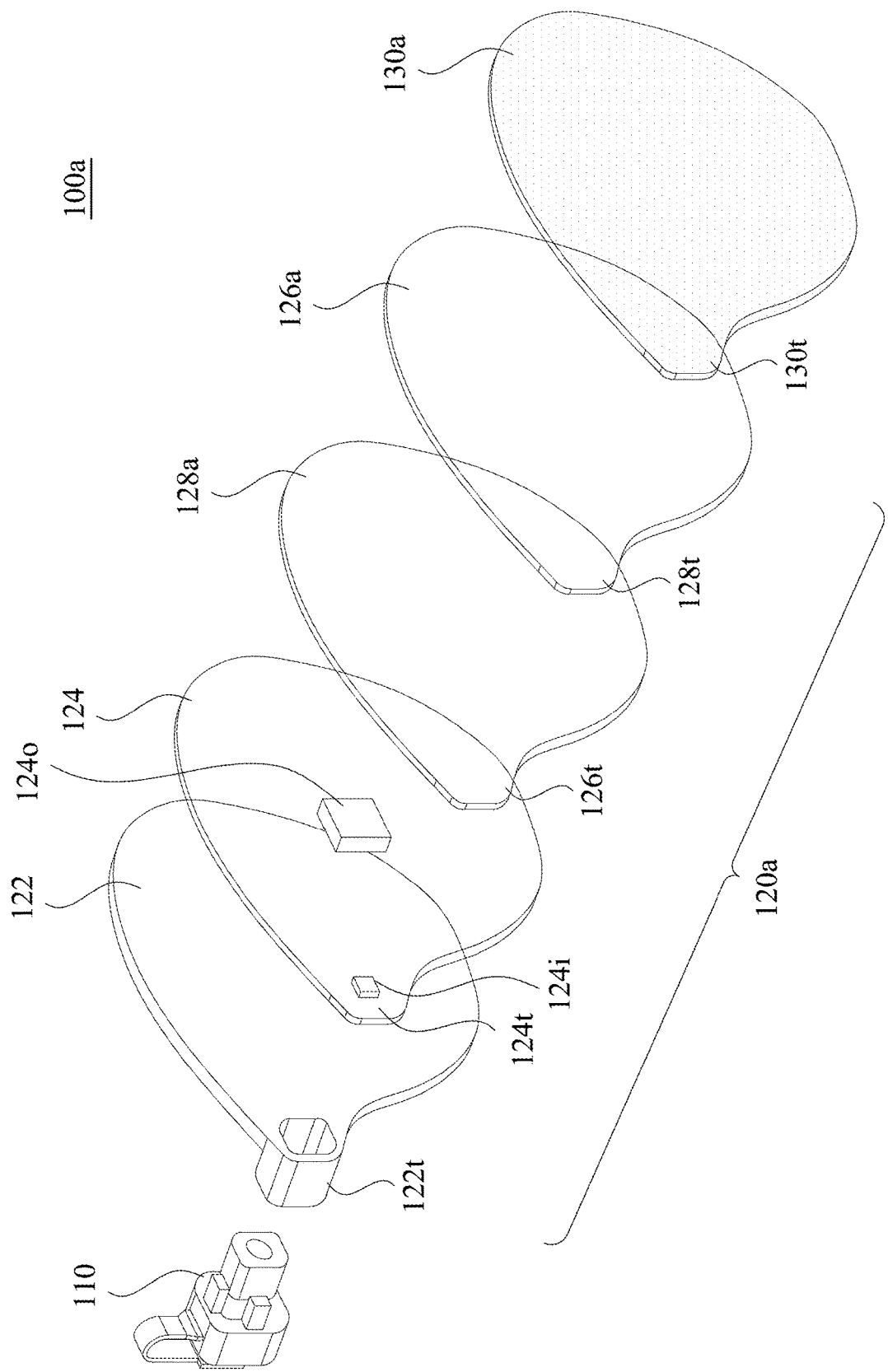
FIG. 4 is an exploded view of the augmented reality display device of FIG. 3.

FIG. 3 is a stereogram of an augmented reality display device 100a according to another embodiment of the present disclosure. FIG. 4 is an exploded view of the augmented reality display device 100a of FIG. 3. Refer to FIG. 3 and FIG. 4, an augmented reality display device 100a includes a light source 110, a waveguide module 120a and a solar charging layer 130a. The difference between the present embodiment and the embodiment of FIG. 1 and FIG. 2 is that, the electrochrome layer 126a of the augmented reality display device 100a is located at the outmost of the waveguide module 120a. In other words, the electrochrome layer 126a is located between the solar charging layer 130a and the second glass layer 128a, and the second glass layer 128a is located between the electrochrome layer 126a and the waveguide element 124. Furthermore, in the present embodiment, the solar charging layer 130a is detachably attached to a surface of the electrochrome layer 126a facing away the second glass layer 128a and is configured to charge the battery in the light source 110. The detachable solar charging layer 130a can play a role like a dry cell. When the lifetime of the solar charging layer 130a reaches its limit, the solar charging layer 130a can be detached independently and changed into a new solar charging layer 130a, which improve the lifespan of the product without reinstall solar cell with the whole product disassembled, which improves the convenience and reusability of the product.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An augmented reality display device, comprising:
a light source having a light-emitting area;
a waveguide module located on the light-emitting area of the light source and comprising:
a first glass layer located on the light-emitting area of the light source;
a waveguide element located on a surface of the first glass layer facing away the light source;
an electrochrome layer located on a surface of the waveguide element facing away the first glass layer; and
a second glass layer located a surface of the electrochrome layer facing away the waveguide element; and
a solar charging layer located on a surface of the second glass layer facing away the electrochrome layer, wherein the solar charging layer electrically connects the light source and is configured to charge the light source.

2. The augmented reality display device of claim 1, wherein the first glass layer has a first protruding portion, and the first protruding portion is engaged to the light-emitting area of the light source.

3. The augmented reality display device of claim 1, wherein the waveguide element comprises a light in-coupling area and a light-out-coupling area.

4. The augmented reality display device of claim 3, wherein the waveguide element has a second protruding portion, and the light in-coupling area of the waveguide element is located in the second protruding portion.

5. The augmented reality display device of claim 4, wherein the second protruding portion of the waveguide element overlaps with the light source.

6. The augmented reality display device of claim 1, wherein the electrochrome layer has a third protruding portion, and the third protruding portion of the electrochrome layer overlaps with the light source.

7. The augmented reality display device of claim 1, wherein the second glass layer has a fourth protruding portion, and the fourth protruding portion of the second glass layer overlaps with the light source.

8. The augmented reality display device of claim 1, wherein the solar charging layer has a fifth protruding portion, and the fifth protruding portion of the solar charging layer overlaps with the light source.

9. An augmented reality display device, comprising:
   a light source having a light-emitting area;
   a waveguide module located on the light-emitting area of the light source and comprising:
      a first glass layer located on the light-emitting area of the light source;
      a waveguide element located on a surface of the first glass layer facing away the light source;
      an second glass layer located on a surface of the waveguide element facing away the first glass layer; and
      a electrochrome layer located a surface of the second glass layer facing away the waveguide element; and
   a solar charging layer detachably located on a surface of the electrochrome layer facing away the second glass layer, wherein the solar charging layer electrically connects the light source and is configured to charge the light source.

10. The augmented reality display device of claim 9, wherein the first glass layer has a first protruding portion, and the first protruding portion is engaged to the light-emitting area of the light source.

11. The augmented reality display device of claim 9, wherein the waveguide element comprises a light in-coupling area and a light-out-coupling area.

12. The augmented reality display device of claim 11, wherein the waveguide element has a second protruding portion, and the light in-coupling area of the waveguide element is located in the second protruding portion.

13. The augmented reality display device of claim 12, wherein the second protruding portion of the waveguide element overlaps with the light source.

14. The augmented reality display device of claim 9, wherein the second glass layer has a fourth protruding portion, and the fourth protruding portion of the second glass layer overlaps with the light source.

15. The augmented reality display device of claim 9, wherein the solar charging layer has a fifth protruding portion, and the fifth protruding portion of the solar charging layer overlaps with the light source.

16. An augmented reality display device, comprising:
   a light source having a light-emitting area;
   a waveguide module located on the light-emitting area of the light source and comprising:
      a first glass layer having a first protruding portion;
      a waveguide element located on a surface of the first glass layer facing away the light source;
      an electrochrome layer located on a surface of the waveguide element facing away the first glass layer; and
      a second glass layer located a surface of the electrochrome layer facing away the waveguide element; and
   a solar charging layer located on a surface of the second glass layer facing away the electrochrome layer, wherein the solar charging layer electrically connects the light source and is configured to charge the light source.

17. The augmented reality display device of claim 16, wherein the waveguide element comprises a light in-coupling area and a light-out-coupling area.

18. The augmented reality display device of claim 17, wherein the waveguide element has a second protruding portion, and the light in-coupling area of the waveguide element is located in the second protruding portion.

19. The augmented reality display device of claim 18, wherein the second protruding portion of the waveguide element overlaps with the light source.

20. The augmented reality display device of claim 16, wherein the electrochrome layer has a third protruding portion, and the third protruding portion of the electrochrome layer overlaps with the light source.

* * * * *